(12) United States Patent
Oehninger et al.

(10) Patent No.: US 7,806,637 B2
(45) Date of Patent: Oct. 5, 2010

(54) POSITIVE-FEED MACHINE TOOL PERMITTING A CLEARING OPERATION

(75) Inventors: Jean Oehninger, Ozoir la Ferriere (FR); Jacques Jaillon, Noisy le Sec (FR)

(73) Assignee: Cooper Power Tools SAS, Ozior la Ferriere Cedex (FR)

( * ) Notice: Subject to any disclaimer, the term of this patent is extended or adjusted under 35 U.S.C. 154(b) by 203 days.

(21) Appl. No.: 12/238,164

(22) Filed: Sep. 25, 2008

(65) Prior Publication Data

US 2009/0022555 A1 Jan. 22, 2009

Related U.S. Application Data

(63) Continuation of application No. 11/177,636, filed on Jul. 11, 2005, now abandoned.

(30) Foreign Application Priority Data

Jul. 23, 2004 (FR) .................................. 04 08204

(51) Int. Cl.
*B23B 47/18* (2006.01)
(52) U.S. Cl. ...................... 408/138; 408/141
(58) Field of Classification Search ......... 408/101–102, 408/137–138, 141, 17; 173/4, 19, 145, 146
See application file for complete search history.

(56) References Cited

U.S. PATENT DOCUMENTS

| | | | |
|---|---|---|---|
| 2,453,136 A | 11/1948 | Karweit et al. | |
| 3,487,729 A * | 1/1970 | Juhasz et al. | 408/14 |
| 3,574,290 A | 4/1971 | Eckman | |
| 3,583,822 A | 6/1971 | Alexander et al. | |
| 3,767,313 A * | 10/1973 | Bohoroquez et al. | 408/14 |
| 3,797,583 A * | 3/1974 | Quackenbush | 173/4 |
| 3,838,934 A | 10/1974 | Petroff | |
| 4,083,646 A | 4/1978 | Vindez | |
| 4,111,590 A | 9/1978 | Burkart et al. | |
| 4,443,139 A | 4/1984 | Eash | |
| 4,591,299 A | 5/1986 | Eckman | |
| 4,592,681 A | 6/1986 | Pennison et al. | |
| 4,612,998 A | 9/1986 | Vindez | |
| 4,681,490 A | 7/1987 | Pennison et al. | |
| 4,688,970 A * | 8/1987 | Eckman | 408/9 |
| 4,799,833 A | 1/1989 | Pennison et al. | |
| 4,822,215 A * | 4/1989 | Alexander | 408/9 |
| 4,850,753 A | 7/1989 | Dudden | |
| 4,854,786 A * | 8/1989 | Alexander et al. | 408/1 R |

(Continued)

FOREIGN PATENT DOCUMENTS

DE 19 58 412 5/1971

(Continued)

*Primary Examiner*—Daniel W Howell
(74) *Attorney, Agent, or Firm*—King & Spalding LLP (57) ABSTRACT

A tool, such as a pneumatic tool, includes a casing, tool-holder spindle extending along an axis, and a drive mechanism for the tool-holder spindle. The mechanism uses a first member for driving the spindle in rotation about its axis and a second member for driving the spindle in translation along its axis. The second drive member is screwed onto a threaded portion of the spindle so that the spindle advances or returns as a function of the relative rate of rotation of the drive members. The second drive member is displaced along the axis between an advanced position and a returned position.

14 Claims, 7 Drawing Sheets

U.S. PATENT DOCUMENTS

| | | | |
|---|---|---|---|
| 5,022,798 A * | 6/1991 | Eckman | 408/1 R |
| 5,143,161 A | 9/1992 | Vindez | |
| 5,149,232 A | 9/1992 | Eckman | |
| 5,351,797 A | 10/1994 | Lawson et al. | |
| 6,193,447 B1 | 2/2001 | Thames et al. | |
| 6,196,772 B1 | 3/2001 | Thames et al. | |
| 6,261,033 B1 | 7/2001 | Thames et al. | |
| 2006/0018724 A1 | 1/2006 | Oehninger et al. | |
| 2008/0260485 A1 | 10/2008 | Jaillon | |
| 2009/0074525 A1 | 3/2009 | Jaillon | |
| 2009/0245955 A1 | 10/2009 | Maillard | |

FOREIGN PATENT DOCUMENTS

| | | |
|---|---|---|
| DE | 37 42 725 | 7/1989 |
| FR | 2 829 952 | 3/2003 |

* cited by examiner

POSITIVE-FEED MACHINE TOOL PERMITTING A CLEARING OPERATION

CROSS REFERENCE TO RELATED APPLICATIONS

This application is a continuation of and claims priority to U.S. patent application Ser. No. 11/177,636, filed Jul. 11, 2005 now abandoned, titled, "Positive-Feed Machine Tool Permitting a Clearing Operation," which claims priority to French Patent Application No. 04 08 204, filed on Jul. 23, 2004, the entire contents of both are hereby incorporated herein by reference.

TECHNICAL FIELD

The present invention relates to a machine tool of the type comprising:
  a casing,
  a tool-holder spindle extending along an axis,
  a mechanism for driving the tool-holder spindle, the mechanism comprising:
    a first member for driving the spindle in rotation about its axis relative to the casing,
    a second member for driving the spindle in translation along its axis relative to the casing, the second member for driving in translation being screwed onto a threaded portion of the spindle so that the spindle advances or returns along the axis as a function of the relative rate of rotation of the drive members.

The invention is applicable, for example, to the pneumatic drilling tools used in aircraft construction.

BACKGROUND TO THE INVENTION

A tool of the above-mentioned type is known, for example, from U.S. Pat. No. 5,351,797. The drive mechanism of such a tool is referred to as "having positive feed" in English or as "à avance mécanique" in French.

A single motor thus ensures, via the drive mechanism, that the spindle is driven in rotation about its axis and, at the same time, that it is advanced or returned by translation along its axis.

Since the translation and rotation drives of the spindle are connected mechanically, the advance of the spindle per revolution is constant. Thus, the variations in the speed of the motor have no effect on the rate of advance per revolution. The thickness of the swarf formed therefore remains constant and promotes the surface quality and the precision of the bores drilled by such a tool.

Although such a tool is found to be generally satisfactory, its use for drilling deep bores or materials renowned for being difficult, such as composite materials, may prove to be tricky.

For example, when a deep bore is drilled, the swarf accumulates in the flutes of the drill carried by the spindle until the motor of the tool is caused to stall. It is then necessary to proceed in several stages or to start fresh drilling cycles for the same bore to be drilled.

The drilling quality may also be degraded if the drill is repositioned incorrectly relative to the bore which has been started. The pressure of the swarf inside the bore also causes the deterioration of the surface thereof.

In order to be able to eliminate the swarf accumulated in the flutes of the drill, it would be possible to retract the spindle while continuing to drive it in rotation about its axis. Such a movement in fact corresponds to the return movement generally produced by the positive feed mechanism.

However, such a return would necessitate an interruption to the drilling cycle in progress, so that it would be necessary to start a fresh drilling cycle from the beginning.

The duration of the clearing operation carried out in that manner would be extremely long, leading to unacceptable drilling times.

DE 37 42 725 describes a machine tool which permits the rapid retraction of the spindle in the course of a machining operation. The return of the spindle is therefore ensured by a complicated system.

An object of the invention is to solve this problem by providing a tool of the type mentioned above which is simple and which permits the drilling of deep bores or materials renowned for being difficult in a reduced time.

SUMMARY OF THE INVENTION

1. To that end, the invention relates a machine tool of the type comprising:
  a casing,
  a tool-holder spindle extending along an axis, a mechanism for driving the tool-holder spindle, the mechanism comprising:
  a first member for driving the spindle in rotation about its axis relative to the casing,
  a second member for driving the spindle in translation along its axis relative to the casing, the second drive member being screwed onto a threaded portion of the spindle so that the spindle advances or returns along the axis as a function of the relative rate of rotation of the drive members, and further comprising means for displacing the second drive member relative to the casing along the axis between an advanced position and a returned position.

According to particular embodiments, the tool may comprise one or more of the features of the dependent claims appended hereto.

BRIEF DESCRIPTION OF DRAWINGS

The invention will be better understood on reading the following description which is given purely by way of example and with reference to the appended drawings in which.

DESCRIPTION OF PREFERRED EMBODIMENTS

Throughout the following, the terms "right", "left", "vertical", "horizontal", "lower", "upper", "top" and "bottom" are to be understood in relation to the position of the tool in the Figures.

Figure 1:
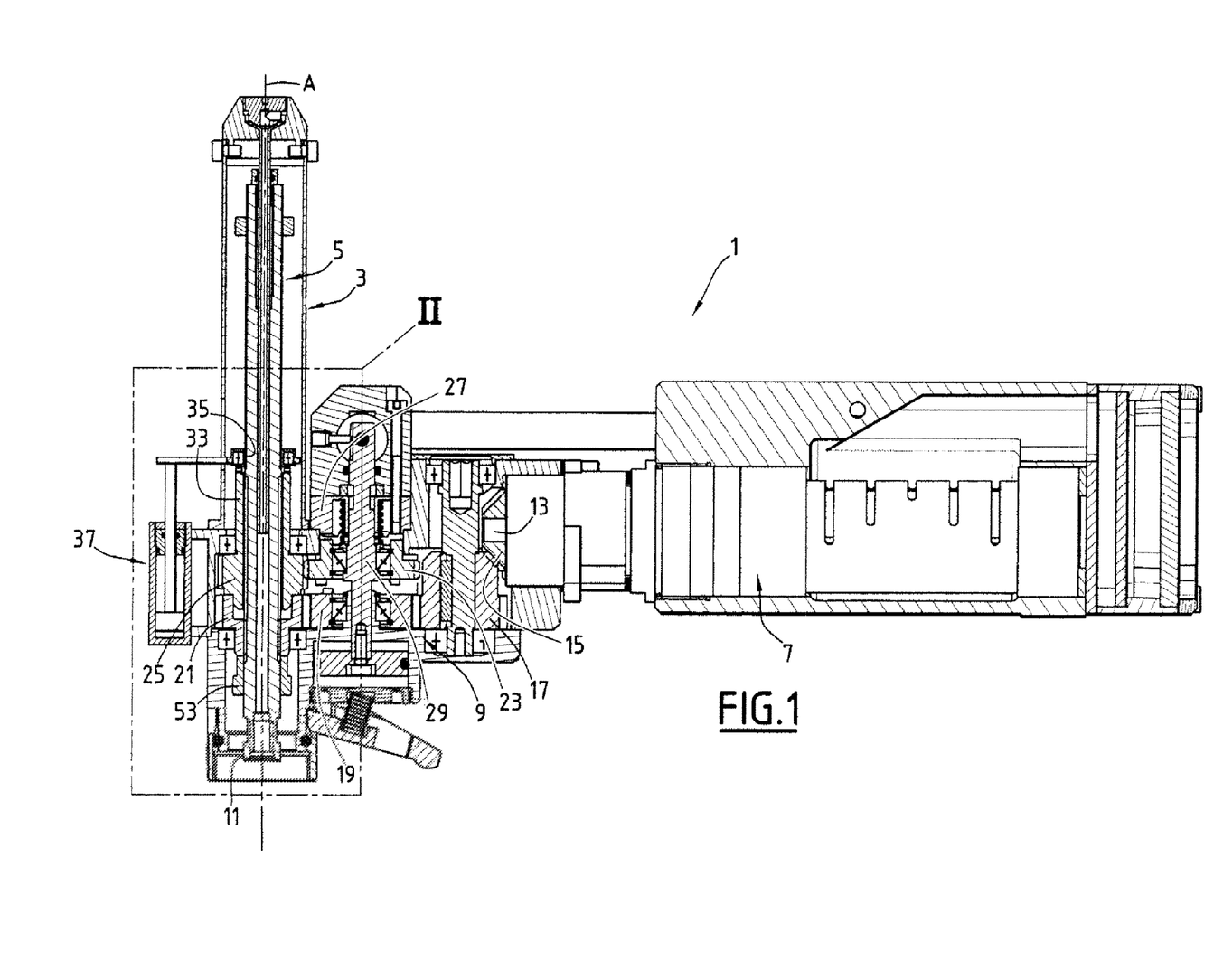
FIG. 1 is a diagrammatic view in lateral section of a tool according to the invention.

FIG. 1 illustrates diagrammatically a portable drilling tool 1 which comprises principally:
- a casing 3,
- a tool-holder spindle 5 extending along a vertical axis A,
- a motor 7, for example a pneumatic motor, and
- a spindle-driving mechanism 9 connecting the motor 7 and the spindle 5 mechanically.

The spindle 5 is received in the casing 3 in such a manner that it is mobile in rotation about its axis A and in translation along that axis A.

In a conventional manner, a boring drill can be mounted in a removable manner at the lower end 11 of the spindle 5. The output shaft 13 of the motor 7 carries a first bevel gear wheel 15 which meshes with a second bevel gear wheel 17 belonging to the drive mechanism 9. In the example shown, the motor 7 is disposed substantially at right-angles relative to the spindle 5. However, it could be substantially parallel with the latter, as explained, for example, in the document FR 2 829 952.

Figure 2:
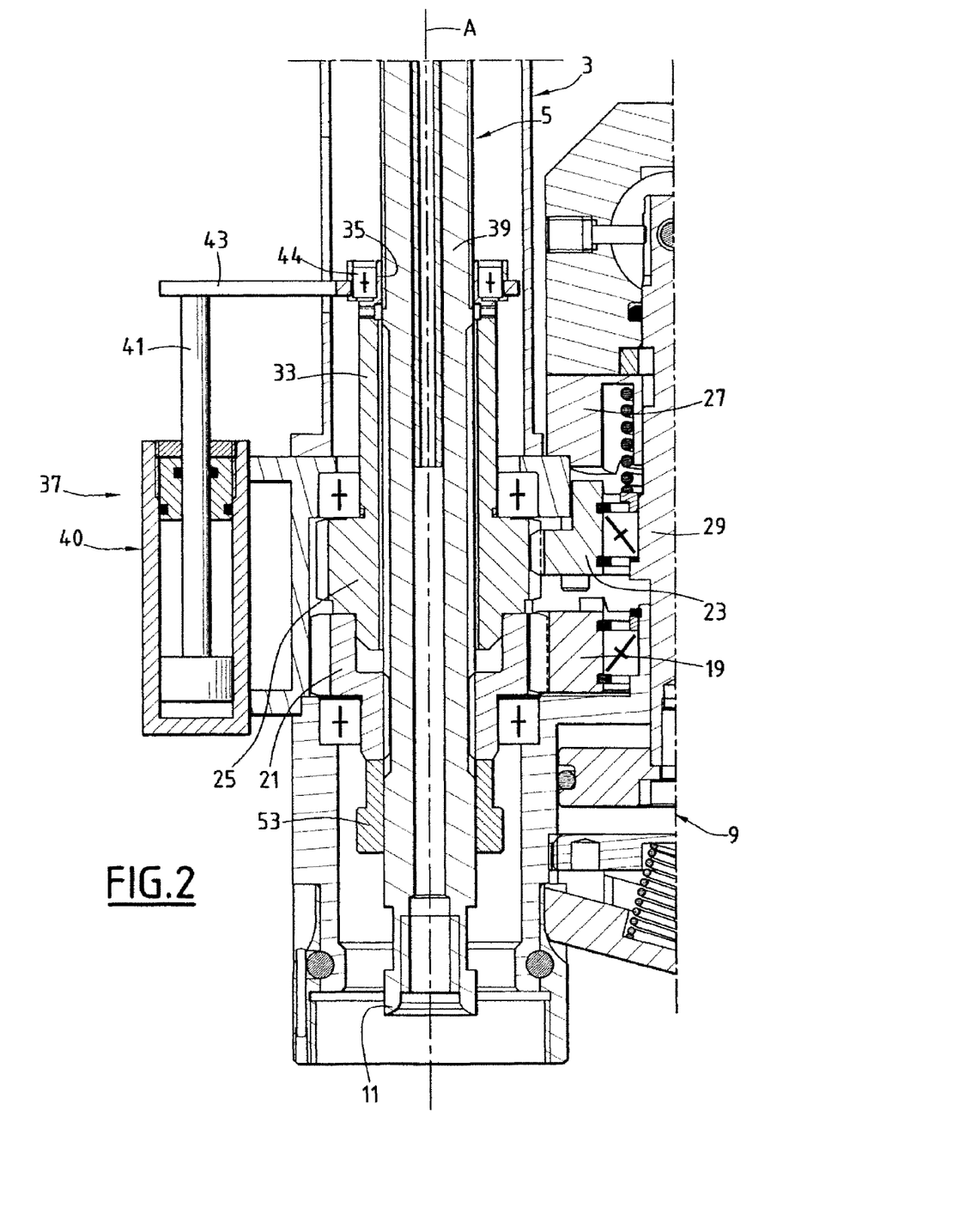
FIG. 2 is an enlarged diagrammatic view of the portion II of FIG. 1, illustrating in particular the displacement means of the second drive member of the spindle of the tool of FIG. 1.

As illustrated by FIGS. 1 and 2, the drive mechanism 9 comprises, in addition to the second bevel gear wheel 17, the following elements, so that it constitutes a mechanism referred to as "having positive feed" in English or as "à avance mécanique" in French:
- a first gear wheel/positive clutch 19 meshing with the second bevel gear wheel 17,
- a first gear wheel 21 meshing with the first gear wheel/positive clutch 19,
- a second gear wheel/positive clutch 23 surmounting the first gear wheel/positive clutch 19,
- a second gear wheel 25 which surmounts the first gear wheel 21, and
- a fixed positive clutch 27 which surmounts the second gear wheel/positive clutch 23 and which is, for example, fixedly joined to the casing 3.

The first gear wheel 21 is slipped onto the spindle 5 and is fixed for rotation with the latter. The spindle 5 is mobile in translation relative to the gear wheel 21 along the axis A. This connection between the spindle 5 and the first gear wheel 21 is, for example, obtained by means of splines.

In a conventional manner, the second gear wheel/positive clutch 23 is carried by a slide 29 in order to be mobile between a lowered position, in which the second gear wheel/positive clutch 23 is form-fitted to the first gear wheel/positive clutch 19 and is therefore fixed for rotation with the latter, and a raised position in which the second gear wheel/positive clutch 23 is form-fitted to the fixed positive clutch 27 and is therefore fixed in rotation relative to the casing 3.

In FIG. 1, the second gear wheel/positive clutch 23 has been shown in an intermediate position between its two extreme positions.

In a conventional manner, the numbers of teeth of the gear wheels/positive clutches 19 and 23 and of the gear wheels 21 and 25 are adapted in such a manner that, when the two gear wheels/positive clutches 19 and 23 are form-fitted to each other, the gear wheel 25 rotates at a slightly higher rate than that of the gear wheel 21 in order to drive the spindle in translation towards the bottom, in an advance movement, as will be described hereinafter.

Unlike conventional positive-feed mechanisms, the second gear wheel 25 is free to rotate relative to the spindle 5 and is therefore not screwed onto a threaded portion of the latter.

The second gear wheel 25 is extended towards the top by a rotary positive clutch 33 which is, for example, integral with the second gear wheel 25. By way of variation, the positive clutch 33 can be secured to the latter.

The positive clutch 33 is therefore fixed for rotation with the second gear wheel 25 and can rotate freely relative to the spindle 5 about its axis A.

The drive mechanism 9 also comprises, as can be seen more clearly in FIG. 2, a dog/positive clutch 35, which surmounts the positive clutch 33, and means 37 for displacing the dog/positive clutch 35 relative to the casing 3.

The dog/positive clutch 35 is screwed onto a threaded portion 39 of the spindle 5. The displacement means 37 comprise a pneumatic jack 40 whose rod 41 is extended laterally by a fork 43 which receives the dog/positive clutch 35 by way of a roller bearing 44. The dog/positive clutch 35 can therefore rotate freely in the fork 43 about the longitudinal axis A of the spindle 5, and is fixed for translation with the fork 43 along that axis.

The dog/positive clutch 35 is mobile in translation along the axis A relative to the casing 3, under the action of the jack 40 between:
- a position which is lowered (FIGS. 1 and 2), or advanced if the direction of advance of the spindle 5 is considered, in which position the dog/positive clutch 35 and the positive clutch 33 are form-fitted to each other, and
- a position which is raised (not shown in the Figures), or returned if the direction of advance of the spindle 5 is considered, in which position the dog/positive clutch 35 and the positive clutch 33 are freed from each other.

In the advanced position, the dog/positive clutch 35 is fixed for rotation with the positive clutch 33 and therefore with the second gear wheel 25.

If the second gear wheel/positive clutch 23 is in the lowered position and if the motor 7 is supplied with pressurised air, the dog/positive clutch 35 rotates about the axis A at a rate slightly higher than that of the first gear wheel 21. The drive mechanism 9 therefore ensures:
- the driving in rotation of the spindle 5 via the gear wheel/positive clutch 19 and the first gear wheel 21 and, at the same time,
- the advance of the spindle 5, that is to say, its displacement in translation towards the bottom along the axis A, this advance being due to the helical connection between the spindle 5 and the dog/positive clutch 35 and to the difference in the rates of rotation between the dog/positive clutch 35 and the gear wheel 21 and therefore the spindle 5.

If the spindle 5 is driven in rotation in the clockwise direction, the thread of the helical connection between the spindle 5 and the dog/positive clutch 35 is left-handed in order to ensure the described advance movement.

The first drive mode enables a bore to be drilled in a workpiece by means of a drill carried by the spindle 5.

Since the dog/positive clutch 35 is still in its advanced position, if the second gear wheel/positive clutch 23 passes into its raised position, the drive mechanism 9 ensures:
- the driving in rotation of the spindle 5 via the first gear wheel/positive clutch 19 and the first gear wheel 21 and, at the same time,
- the return of the spindle 5, that is to say, its displacement in translation towards the top along the axis A, the second gear wheel/positive clutch 23, the second gear wheel 25, the positive clutch 33 and the dog/positive clutch 35 then being fixed in position, the rotation of the spindle 5 about its axis A ensuring the return movement owing to the helical connection between the dog/positive clutch 35 and the spindle 5.

This second drive mode enables the spindle 5 to be returned when the drilling of the bore has been completed.

The displacement means 37 also enable clearing operations to be carried out during a drilling cycle. For that purpose, and assuming that the spindle 5 is driven in accordance with its first drive mode, the jack 40 is caused to displace the dog/positive clutch 35 towards its returned position.

Owing to the helical connection between the dog/positive clutch 35 and the spindle 5, the spindle 5 accompanies the dog/positive clutch 35 in translation along the axis A. This movement continues until the return abutment 53, which is secured to the spindle 5 beneath the gear wheel 21, bears on the latter, as illustrated in FIGS. 1 and 2. The spindle 5 has therefore returned and the drill has re-emerged completely from the bore that is in the process of being drilled. Adjustment to the clearing path is therefore unnecessary.

The dog/positive clutch 35 is then disengaged from the positive clutch 33. The dog/positive clutch 35 is then driven in rotation by the spindle 5 owing to the friction between the female thread of the dog positive clutch 35 and the threaded portion 39 of the spindle 5. The roller bearing 44 enables the friction between the fork 43 and the dog/positive clutch 35 to be limited in order to permit the rotation of the dog/positive clutch 35 with the spindle 5 about the axis A.

In the course of this clearing operation, the spindle 5 is still driven in rotation about its axis A via the first gear wheel/positive clutch 19 and the first gear wheel 21.

The swarf produced previously during the drilling operation is then evacuated.

In order to resume drilling, the displacement means 37 bring the dog/positive clutch 35 back to its advanced position.

As there has been no relative rotation between the dog/positive clutch 35 and the spindle 5 during the clearing operation, the spindle 5 and therefore the drill which it carries resume the position they occupied before clearing and the drilling operation can be resumed.

It will be appreciated that, if friction were to brake the rotation of the dog/positive clutch 35 relative to the fork 43 during the clearing operation, it would be in no way detrimental to the resumption of the drilling operation because the dog/positive clutch 35 would be screwed at the very most slightly onto the spindle 5, which would then be delayed only slightly in its original position when drilling was resumed.

The tip of the drill carried by the spindle 5 would therefore, when it returned, be in no danger of crashing into the base of the bore in the process of being drilled.

It will be appreciated that the clearing path of the spindle 5 depends on the depth of the bore already drilled.

This is because the jack 40 tends to drive the spindle 5 over the entire path of its rod 41, but the return of the spindle 5 is limited by the bearing of the abutment 53 on the gear wheel 21.

The displacement means 37 enable the clearing operation to be carried out in a relatively short time since the return of the spindle 5 is not provided for by the helical connection between the dog/positive clutch 35 and the spindle 5, which would lead to a very considerable return time and then subsequent advance time of the spindle 5, but by axial displacement of the dog/positive clutch 35 relative to the casing.

In addition, the drilling operation is resumed almost instantaneously. The drilling tool 1 thus enables drilling operations to be carried out in short times, even for the drilling of bores of great depth or materials renowned for being difficult. Furthermore, the bores produced are of good quality, in particular owing to the fact that the drilling tool 1 enables the advantages of positive-feed mechanisms to be exploited.

This is because the drive mechanism 9 comprises a first member for driving the spindle 5 in rotation, which member is constituted by the gear wheel 21, and a second member for driving the spindle 5 in translation, which member is constituted by the dog/positive clutch 35, the advance or return of the spindle along the axis A being provided for as a function of the relative rate of rotation of those two drive members.

It will be appreciated that the action of the displacement means 37 on the dog/positive clutch 35 in order to ensure the clearing operation enables the drilling tool 1 to preserve a simple structure.

The linking of the first drive mode, that is to say, the driving in rotation and, simultaneously, the advance of the spindle 5, and the second drive mode, that is to say, the driving in rotation and, simultaneously, the return of the spindle 5, then the stoppage of the supply to the motor 7, can be controlled in a classical manner, for example, automatically by the pneumatic circuit for supplying the motor 7, after operating the button for starting the drilling tool 1.

Likewise, the performance of the clearing operation in the course of a drilling cycle can be controlled automatically, for example, regularly over time.

Figure 3:
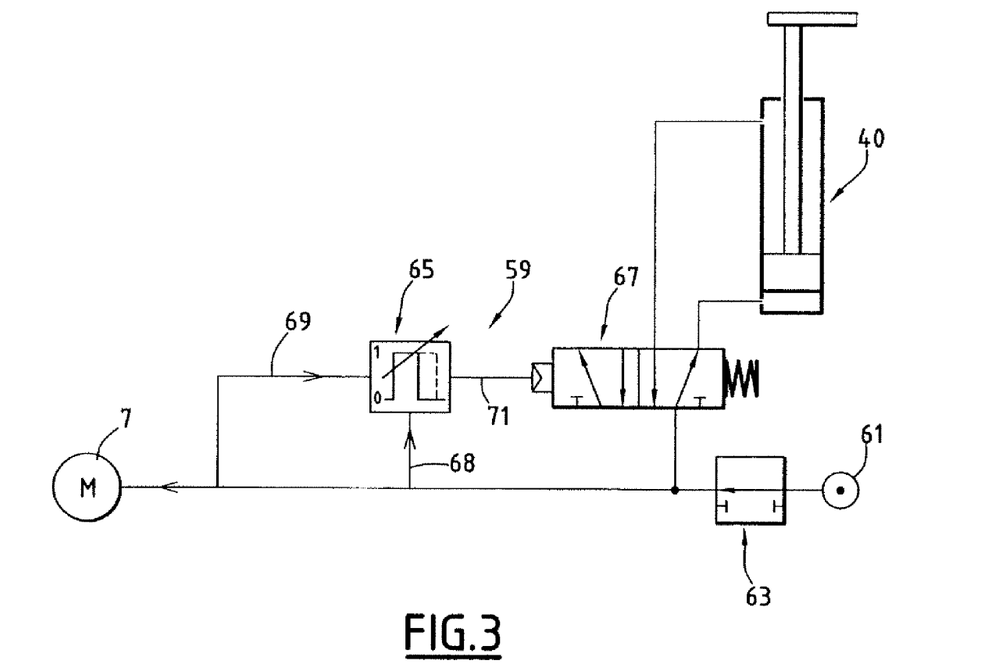
FIG. 3 is a diagrammatic view illustrating a portion of the pneumatic circuit of the tool of FIG. 1.

FIG. 3 illustrates diagrammatically a portion 59 of the pneumatic circuit of the drilling tool 1 enabling such a function to be carried out. In this Figure, the numerical reference 61 denotes the source of pressurised air supplying the motor 7, and the reference 63 denotes a four-way two-position valve controlled by the button for starting the drilling tool 1 in order to bring about the pneumatic supply to the motor 7.

The portion 59 of the pneumatic circuit also comprises a generator 65 of pneumatic pulses and a five-way two-position directional control valve 67.

The pulse generator 65 is connected downstream of the valve 63 by a supply duct 68.

It is also connected, downstream of the valve 63, by a control duct 69 and is linked by an operating duct 71 to the directional control valve 67 in order to operate it. The pulses supplied by the generator 65 are, for example, rectangular waveforms. The duration of these rectangular waveforms as well as the time interval separating them may be adjusted.

When the motor 7 is supplied with compressed air via the valve 63, the generator 65 will regularly produce rectangular pressure waveforms which will be applied by the operating duct 71 to the directional control valve 67. In the presence of such a rectangular pressure waveform, the directional control valve 67 assumes the position which it occupies in FIG. 4, in which position the jack 40 is supplied with compressed air by the source 61 in order to bring the dog/positive clutch 35 into its returned position. The clearing operation is thus initiated.

Figure 4:
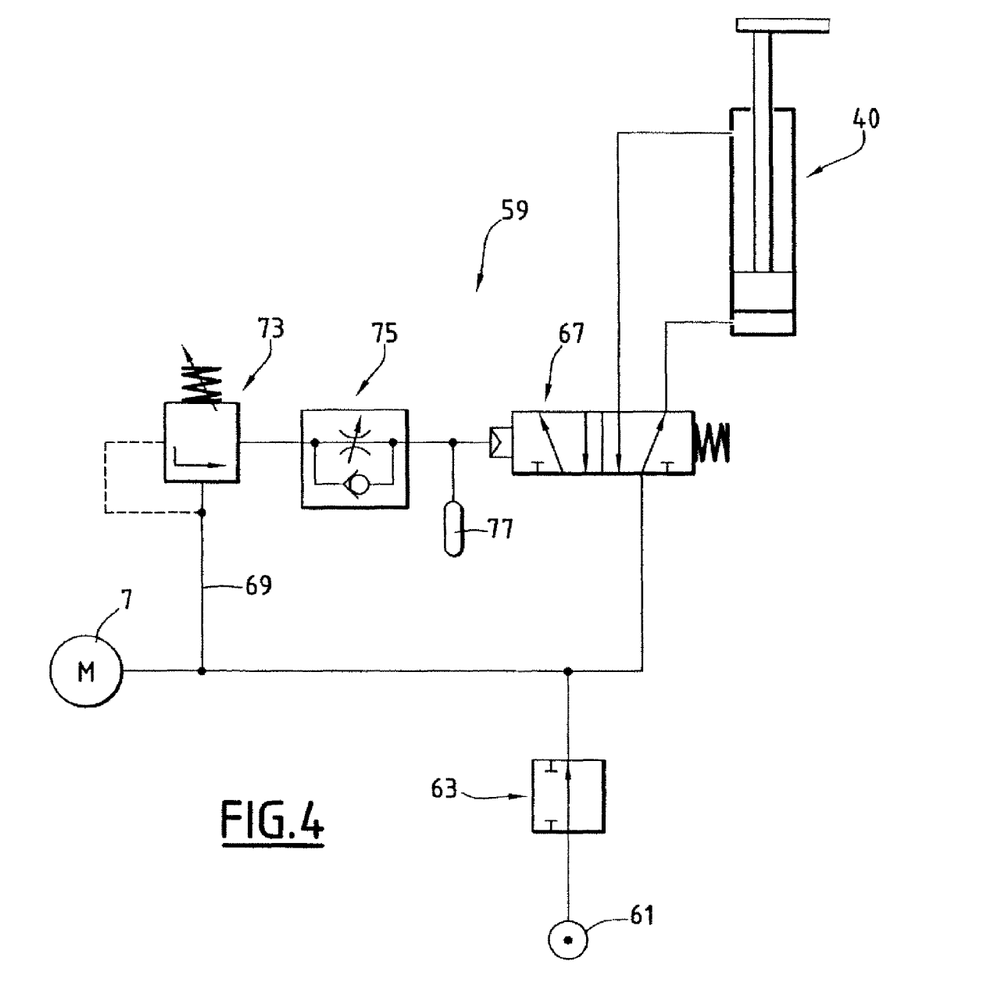
FIG. 4 is a view analogous to FIG. 3 illustrating a variant of the tool of FIG. 1.

The dog/positive clutch 35 is maintained in this position for the entire duration of the rectangular waveform.

At the end of the rectangular waveform, the directional control valve 67 no longer receives operating pressure and the directional control valve 67 is returned resiliently to its other position in which the jack 40 is supplied with compressed air by the source 61 in order to bring the dog/positive clutch 35 back into its advanced position. The clearing operation is thus terminated.

The next clearing operation will take place when the following rectangular waveform produced by the generator 65 appears. As indicated above, the temporal spacing of the rectangular waveforms produced by the generator 65 can be adjusted in order to modify the clearing frequency.

FIG. 4 illustrates a variant of the tool of FIGS. 1 to 3, in which variant the clearing operation is not triggered on a regular time basis but as a function of requirements.

To that end, the portion 59 of the pneumatic circuit comprises in succession, on the control side of the directional control valve 67:

a valve 73 for controlling the load on the motor 7, which valve is connected by the duct 69 downstream of the valve 63, a non-return valve 75, and an air reserve 77.

When clearing is necessary, the load on the motor 7 and the torque which it applies increase, as does the pressure upstream of the motor 7.

When this pressure present in the duct 69 exceeds a predetermined and adjustable threshold, the valve 73 permits the passage of the pressurised air which passes through the non-return valve 75, fills the air reserve 77 and is applied to the control side of the directional control valve 67. The directional control valve 67 then passes into the position which it occupies in FIG. 5, in which position the jack 40 is supplied with compressed air by the source 61 in order to bring the dog/positive clutch 35 into its returned position. The clearing operation commences.

Figure 5:
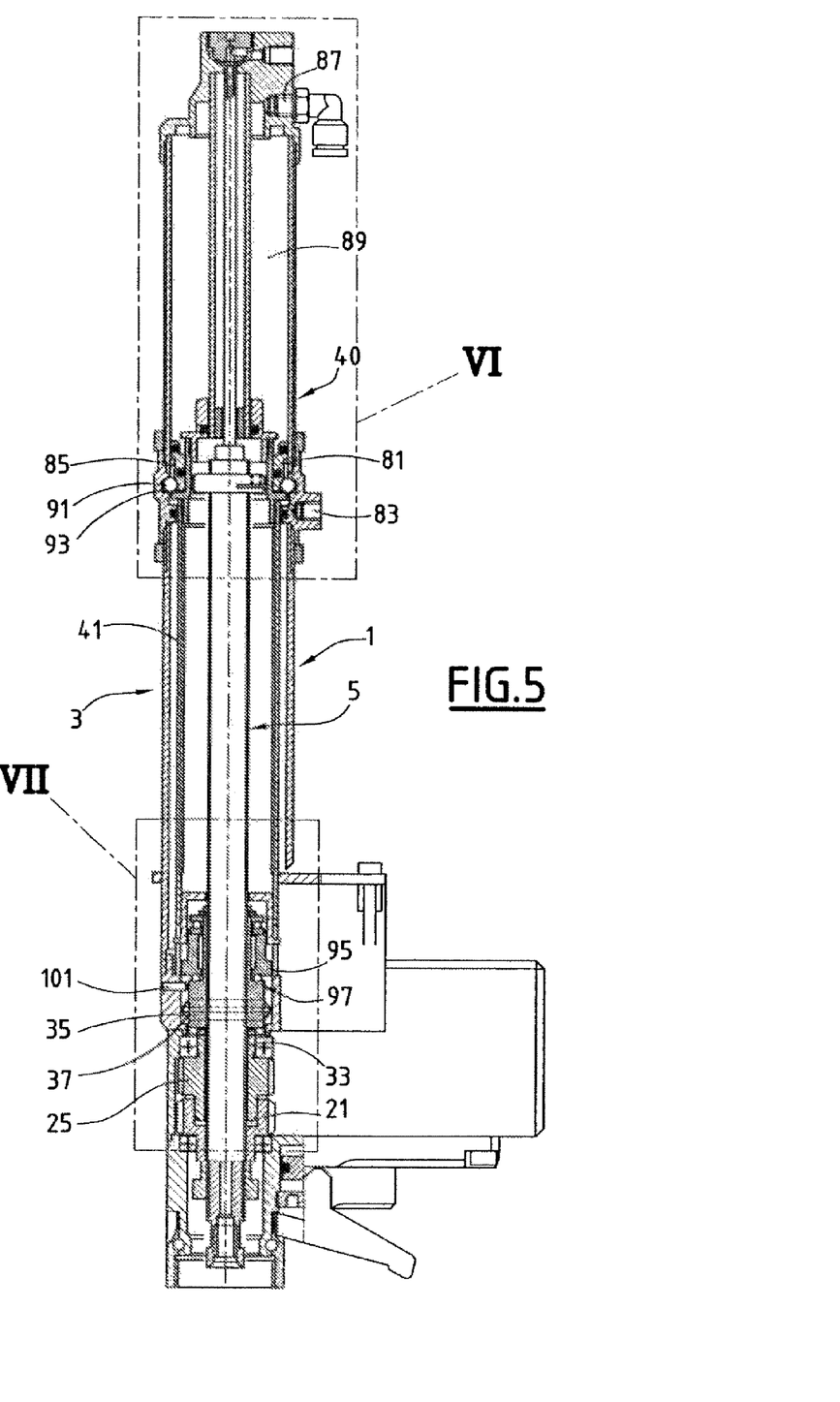
FIG. 5 is a view analogous to FIG. 1 illustrating a variant of the tool of FIG. 1, and FIGS. 6 and 7 are enlarged diagrammatic views of portions VI and VII of the tool of FIG. 5.

The load on the motor 7 will then decrease but the directional control valve 67 is maintained in the position which it occupies in FIG. 5 by means of the pneumatic air contained in the reserve 77. The clearing operation continues.

When the air reserve 77 has been sufficiently depleted, the directional control valve 67 is returned resiliently to its second position, in which the jack 40 is supplied with pressurised air by the source 61 in order to displace the dog/positive clutch 35 into its advanced position.

The clearing operation is thus terminated.

Only the portion 59 of the pneumatic circuit of the drilling tool 1 has been described above, the other portions enabling a drilling cycle to be performed automatically, that is to say, the first drive mode, then the second drive mode and finally the stoppage of the pneumatic motor 7, being conventional.

The elements described above may be applied to an electrical drilling tool 1 rather than to a pneumatic tool. If it is desired to carry out the clearing operation as a function of requirements, it is possible to compare the intensity of the electric current for supplying the motor 7 with a predetermined value in order to trigger the clearing operation when the measured value is higher than the predetermined value. The quantity representative of the torque provided by the motor is then the intensity of the electric supply current while, for the pneumatic tool of FIG. 1, it was the pressure upstream of the motor 7.

By way of variation, the displacement means 37 may be controlled as a function of the thrust applied by the drill to the workpiece to be drilled.

In the case of a pneumatic tool, the portion 59 of the pneumatic circuit may comprise, for example, a spring which is interposed between the fork 43 and the rod 41 of the jack and which, beyond a predetermined thrust force, brings about the supply to the jack 40 in order to trigger the clearing operation.

In the case of an electrical tool, the control device can compare a drill thrust measurement made by a strain gauge with an adjustable predetermined thrust value, beyond which the clearing operation is triggered by the control device.

The displacement means 37 may have a structure and a location other than that described above. In particular, the jack 40 may be coaxial with the spindle 5 and may be disposed above the latter, the jack 40 then being able to constitute a portion of the casing 3 surrounding the spindle 5.

Figure 6:
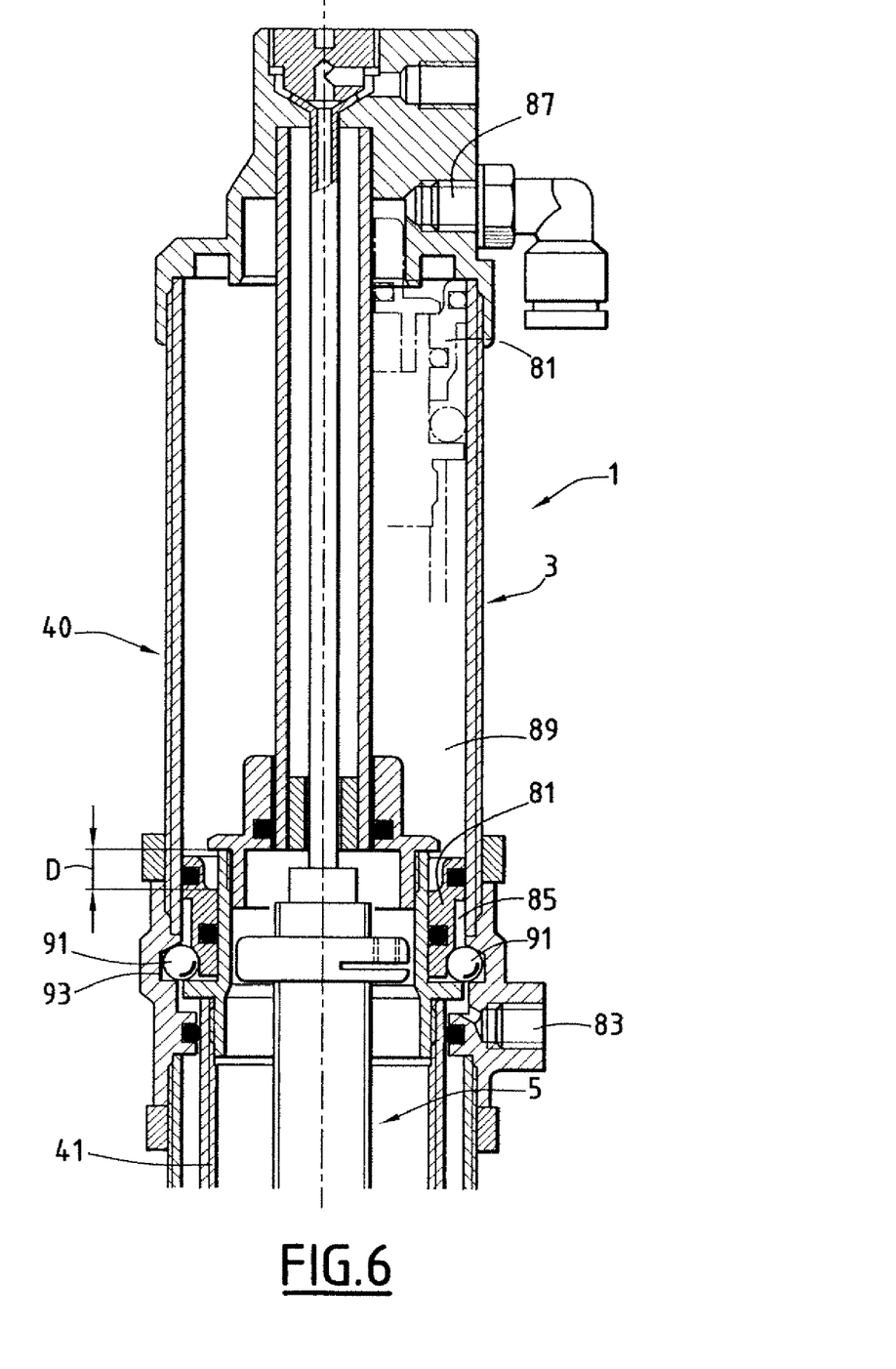
Figure 7:
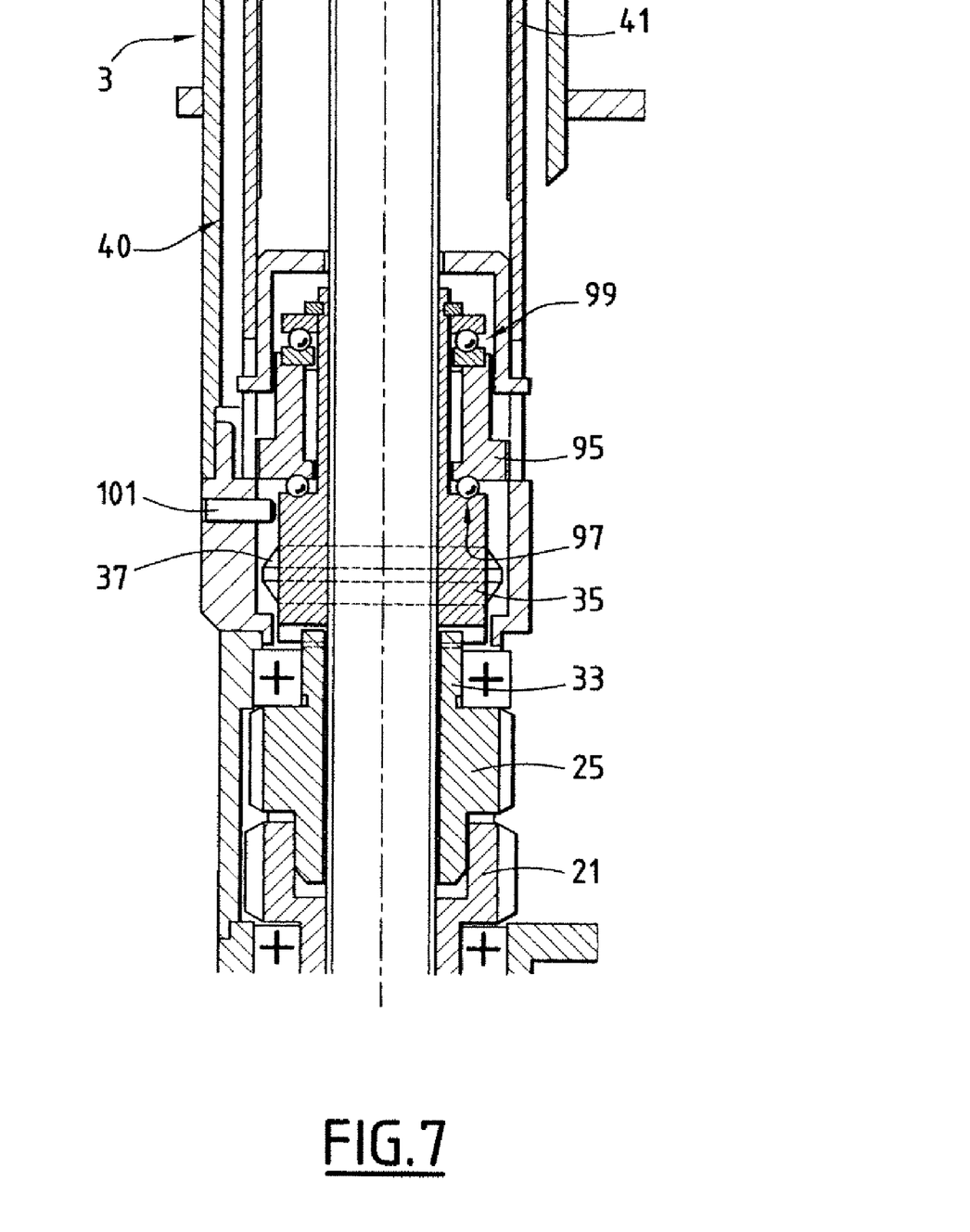

Such a variant is illustrated by FIGS. 5 to 7.

As can be seen more clearly in FIG. 6, the casing 3 forms the external portion of the cylinder of the jack 40. The rod 41 then has a tubular shape and surrounds the spindle 5. The piston 81 of the jack 40 is then disposed between the upper end of the rod 41 and the casing 3.

The piston 81 is mobile between an advanced position illustrated with heavy lines in FIG. 6 and a returned position which is drawn in partially with a dot-dash line at the top right of FIG. 6.

In order to cause the piston 81 to pass from its advanced position to its returned position, pressurised air is introduced via the opening 83 into the return chamber 85 delimited inside the casing 3 beneath the piston 81, and this pressurised air then pushes the piston 81 towards the top until it brings it into its returned position.

In order to bring the piston back into its advanced position, air is introduced via the opening 87 into the advance chamber 89 delimited inside the casing 3 above the piston 81.

The rod 41 is driven axially by the piston 81 and therefore follows it in its axial displacements.

In the variant illustrated in FIGS. 5 to 7, the drilling tool 1 comprises elements 91 for retaining the piston 81, and therefore the rod 41, in their advanced positions. These retaining elements 91 are spheres 91 which are disposed beneath the piston 81 and which engage partially in a circular groove 93 in the casing 3.

In the absence of pressurised air supplying the opening 83, these elements 91 oppose the return of the piston 81 by bearing on the upper wall of the groove 93. The casing 3 then absorbs mechanically the thrust force exerted by the drill on the machined workpiece.

Thus, the jack 40 used does not have to ensure pneumatically the retention of the rod 41 during the machining operation. The jack 40 may therefore have relatively small dimensions and not increase the overall space requirement of the drilling tool 1, as in the example illustrated.

It will be appreciated that there is a slight possibility of axial clearance D between the rod 41 and the piston 81 which, during the supply of air to the chamber 85, enables the piston 81 to be raised slightly relative to the rod 41 in order to permit the disengagement of the balls 91 from the groove 93 and thus the return of the rod 41 relative to the casing 3.

FIG. 7 illustrates more particularly the connection of the lower end 95 of the rod 41 to the dog/positive clutch 35. This connection is provided, for example, by a lower ball bearing 97 and an upper thrust ball bearing 99 which enable the rod 41 to provide for the movements of advance and return of the dog/positive clutch 35 as described for the previous variants.

In the variant of FIGS. 5 to 7, it can be seen that the dog/positive clutch 35 has external raised portions 37 which, during the return movement of the dog/positive clutch 35, momentarily engage with a pin 101 projecting inwards from the casing 3. The pin 101 therefore locks the dog/positive clutch 35 in rotation for a short period of time. Since the spindle 5 continues to be driven in rotation during this momentary stoppage of the dog/positive clutch 35, the dog/positive clutch 35 is screwed slightly onto the spindle 5, with the result that the spindle will be delayed slightly in its original position when the drilling operation is resumed.

It is thus ensured that, when this drilling operation is resumed, the tip of the drill carried by the spindle 5 does not crash into the base of the bore despite the possibilities of deformation which the support of the tool during drilling could present.

More generally, this effect could be obtained with members 37, 101 that are in different forms but that still enable the rotation of the dog/positive clutch 35 relative to the spindle 5 during the return movement thereof to be braked. It will be appreciated that this feature can be used independently of the positioning of the jack 40 coaxially with the spindle 5, similarly to the use of elements 91 for the axial retention of the spindle 5 during a drilling operation.

Likewise, the drilling tool 1 is not necessarily portable and is not necessarily a drilling tool.

More generally, the possibility of translating the spindle 5 permitted by the displacement means 37 can be used for purposes other than the performance of a clearing operation.

More generally, the displacement of the first member 21 for driving the spindle 5 in rotation and the displacement of the second member 35 for driving the spindle 5 in translation can be effected by two separate motors which control each other electronically.

The invention claimed is:

1. A machine tool of the type comprising:
    a casing;
    a tool-holder spindle extending along an axis;
    a drive mechanism for driving the tool-holder spindle, the drive mechanism comprising:
        a first drive member for driving the spindle in rotation about its axis relative to the casing;
        a second drive member for driving the spindle in translation along its axis relative to the casing, the second drive member being screwed onto a threaded portion of the spindle so that the spindle advances or returns along the axis as a function of a relative rate of rotation between the first drive member and the second drive member;
        a drive clutch member connected to the second drive member in order to drive the second drive member in rotation, the second drive member being movable relative to the casing along the axis between an advanced position and a returned position, the second drive member being, in the advanced position, connected in rotation to the drive clutch member, and the second drive member being, in the returned position, not connected in rotation to the drive clutch member.

2. A tool according to claim 1, wherein the first drive member is a gear wheel which is coaxial with and connected in rotation to the spindle, the spindle being able to slide along its axis relative to the first drive member, in that the drive mechanism comprises:
    a first gear wheel/positive clutch meshing with the first drive member, the drive clutch member being a second gear wheel/positive clutch connected to the second drive member in order to be able to drive it in rotation, and in that the second gear wheel/positive clutch is mobile between an advance position of the spindle, in which it is form-fitted to the first gear wheel/positive clutch, and a return position of the spindle in which it is disengaged from the first gear wheel/positive clutch.

3. A tool according to claim 2, wherein the drive mechanism comprises:
    a second gear wheel which is coaxial with the spindle and which meshes with the second gear wheel/positive clutch; and
    a rotary positive clutch which is fixed for rotation with the second gear wheel, and in that the second drive member is a dog/positive clutch which is form-fitted to the positive clutch when the dog/positive clutch is in the advanced position, and which is freed from the positive clutch when the dog/positive clutch is in the returned position.

4. A tool according to claim 2, wherein the drive mechanism comprises a fixed positive clutch which is form-fitted to the second gear wheel/positive clutch when it is in the advance position of the spindle.

5. A tool according to claim 3, wherein the drive mechanism comprises a fixed positive clutch which is form-fitted to the second gear wheel/positive clutch when it is in the advance position of the spindle.

6. A tool according to claim 1, wherein the drive mechanism comprises displacement means for displacing the second drive member between the advanced position and the returned position.

7. A tool according to claim 6, further comprising a device for controlling the displacement means as a function of a torque provided by the drive motor of the spindle.

8. A tool according to claim 7, wherein the control device (59) comprises means for comparing a quantity representative of the torque provided by the motor with a predetermined value beyond which a clearing operation must be triggered.

9. A tool according to claim 7, further comprising a device for controlling the displacement means as a function of a thrust exerted by the tool on a workpiece to be machined.

10. A tool according to claim 7, further comprising a device for controlling the displacement means at regular time intervals.

11. A tool according to claim 10, wherein the displacement means comprises a pneumatic jack, and the control device comprises a generator of pneumatic pulses for producing regularly over time pneumatic pulses for controlling the jack.

12. A tool according to claim 7, wherein the displacement means comprises a jack which is substantially coaxial with the tool-holder spindle.

13. A tool according to claim 1, further comprising additional elements for retaining the second drive member against displacement towards its returned position.

14. A tool according to claim 1, further comprising members for braking the rotation of the second drive member relative to the tool-holder spindle during a displacement of the second drive member from its advanced position to its returned position.

* * * * *